(12) United States Patent
Ketonen

(10) Patent No.: US 11,606,918 B2
(45) Date of Patent: Mar. 21, 2023

(54) FELLING HEAD FOR A MULTI-PROCESS MACHINE

(71) Applicant: Lauri Ketonen, Kristiinankaupunki (FI)

(72) Inventor: Lauri Ketonen, Kristiinankaupunki (FI)

(*) Notice: Subject to any disclaimer, the term of this patent is extended or adjusted under 35 U.S.C. 154(b) by 413 days.

(21) Appl. No.: 16/756,912

(22) PCT Filed: Nov. 6, 2018

(86) PCT No.: PCT/FI2018/050812
§ 371 (c)(1),
(2) Date: Apr. 17, 2020

(87) PCT Pub. No.: WO2019/086768
PCT Pub. Date: May 9, 2019

(65) Prior Publication Data
US 2020/0260662 A1 Aug. 20, 2020

(30) Foreign Application Priority Data
Nov. 6, 2017 (FI) ...................................... 20175988

(51) Int. Cl.
*A01G 23/08* (2006.01)
*B66C 13/14* (2006.01)
*F15B 15/06* (2006.01)
*F16H 21/44* (2006.01)

(52) U.S. Cl.
CPC .............. *A01G 23/08* (2013.01); *B66C 13/14* (2013.01); *F15B 15/06* (2013.01); *F16H 21/44* (2013.01)

(58) Field of Classification Search
CPC .......... F16H 21/44; F15B 15/06; B66C 13/14; A01G 23/08
See application file for complete search history.

(56) References Cited

U.S. PATENT DOCUMENTS

| | | | | |
|---|---|---|---|---|
| 3,294,131 A | * | 12/1966 | Larson | A01G 23/089 144/34.1 |
| 3,590,760 A | | 7/1971 | Boyd | |
| 3,833,034 A | * | 9/1974 | Menzel | A01G 23/085 144/24.13 |
| 3,847,192 A | * | 11/1974 | Jorgensen | E21C 25/60 414/733 |
| 3,868,982 A | * | 3/1975 | Kurelek | A01G 23/083 144/338 |

(Continued)

FOREIGN PATENT DOCUMENTS

| | | |
|---|---|---|
| CA | 2196728 | 8/1998 |
| DE | 4135182 | 4/1993 |
| FR | 2453297 | 10/1980 |

OTHER PUBLICATIONS

Finnish Research Report in Finnish Application No. 20175988 dated May 21, 2018.
(Continued)

*Primary Examiner* — David M Fenstermacher
(74) *Attorney, Agent, or Firm* — Fildes & Outland, P.C.

(57) ABSTRACT

A multi-process machine suspension device is equipped with two hydraulic cylinders for rotating the machine relative to an arm supporting it. One cylinder is pivoted to another arm and the other cylinder to the machine frame. Both cylinders are pivoted by one end to a freely rotating intermediate arm pivoted to the same frame joint as the arm supporting it.

9 Claims, 5 Drawing Sheets

(56) References Cited

U.S. PATENT DOCUMENTS

| | | | |
|---|---|---|---|
| 3,938,566 A * | 2/1976 | Penfold | A01G 23/097 144/24.13 |
| 3,995,671 A * | 12/1976 | Wirt | A01G 23/089 144/34.5 |
| 4,823,852 A * | 4/1989 | Langford | B62D 55/065 180/41 |
| 6,135,175 A * | 10/2000 | Gaudreault | A01G 23/083 144/34.1 |
| 6,575,210 B1 * | 6/2003 | Dye | A01G 23/095 144/357 |
| 6,691,751 B2 * | 2/2004 | Kettunen | A01G 23/083 144/34.1 |
| 6,691,752 B2 * | 2/2004 | DiSabatino | A01G 23/091 144/34.1 |
| 7,296,602 B1 | 11/2007 | Riha et al. | |
| D618,708 S * | 6/2010 | Quirke | D15/28 |
| 9,215,846 B2 * | 12/2015 | Ketonen | A01G 23/08 |
| 9,242,388 B2 * | 1/2016 | Franze | B26D 1/08 |
| 9,781,885 B2 * | 10/2017 | Niekamp | A01G 23/065 |
| 9,835,182 B2 * | 12/2017 | Anderson | F15B 15/04 |
| 10,159,200 B2 * | 12/2018 | Janhunen | A01G 23/065 |
| 2001/0032542 A1 | 10/2001 | Heikkila | |
| 2011/0197997 A1 | 8/2011 | Ketonen | |

OTHER PUBLICATIONS

International Search Report in PCT/FI2018/050812 dated Mar. 18, 2019.
English language abstract of DE 4135182.
English language abstract of FR 2453297.

* cited by examiner

FELLING HEAD FOR A MULTI-PROCESS MACHINE

CROSS-REFERENCE TO RELATED APPLICATIONS

This application claims benefit of priority from International Patent Application No. PCT/FI2018/050812 filed Nov. 6, 2018, which claims benefit of priority from Finland Patent Application No. 20175988 filed Nov. 6, 2017, both of which are incorporated by reference in their entirety.

FIELD OF THE INVENTION

The invention is related to a felling head for a multi-process machine of the type for felling and further processing trees, arranged to be suspended on the boom of a loader via a joint, the multi-process machine including a rotator for rotating it and specifically its suspension device.

BACKGROUND OF THE INVENTION

A conventional multi-process machine includes a base machine, a boom assembly comprising at least one boom and a felling head for felling and further processing of trees. The felling head is arranged to be suspended on said boom via a joint.

The invention is related to a felling head and specifically its suspension device. The suspension device is placed between the felling head and the base machine. The base machine can be a specific harvester base or a conventional rotary excavator.

An excavator is a suitable base for a felling head that performs delimbing and cutting of logs as well as their sorting at a road side landing. More generally, it is also possible to use the term 'multi-process machine', in which case either a multi-process machine or a felling head is concerned.

Since the boom assembly of particularly conventional excavators is designed for excavation work, application of the machine in log harvesting requires a lot of adaptation. The movement range of the boom is disadvantageous during work. This is because the boom head cannot be raised sufficiently high. The felling head tends to contact heaps, the machine's own tracks and even the ground.

A solution is to make the suspension device low. This also reduces swinging of the felling head. Operation of a low, i.e., short suspension device does not directly improve the performance, since the operation of the suspension device in freely suspended felling heads is based on the relation of the centre of gravity of the felling head to the pin at the boom head. In other words, smaller swing angles are sufficient for a longer suspension device. When it is known that the swing angle remains at approximately 120° when using one cylinder, approximately 150° is needed in a short suspension device. In addition, the rotating torque provided by one cylinder quickly decreases in the extreme position.

SUMMARY OF THE INVENTION

The object of this invention is to remove the aforementioned prior art disadvantages and provide an improved suspension device. Accordingly a felling head for a multi-process machine for felling and further processing trees is arranged to be suspended on the boom of a loader via a joint. The multi-process machine includes a rotator for rotating it, a suspension device, an actuator unit and its frame connected to the suspension device for felling and further processing trees. The suspension device includes an arm for the suspension device connected to the rotator, and a transverse frame joint in its bottom part for supporting the frame of the actuator unit. One hydraulic cylinder is pivoted at one end to said arm for the suspension device to rotate it relative to the frame for turning the actuator unit to felling and processing positions. A freely rotating intermediate arm having first and second ends forms a joint spacing there between and pivoted to the frame joint at the first end. Another hydraulic cylinder is pivoted at one end to the frame of the actuator unit and wherein both hydraulic cylinders are pivoted at their other ends to the second end of the intermediate arm.

When equipping the suspension device with a freely rotating, relatively short intermediate arm pivoted to said frame joint and a second hydraulic cylinder in such a way that the hydraulic cylinders are pivoted one after the other between the frame and the beam via the intermediate arm, a surprising mechanism is provided, which is usually a self-stabilising and efficient rotator within a wide rotational range.

BRIEF DESCRIPTION OF THE DRAWINGS

The invention is described below with examples and by making reference to the appended drawings that illustrate a suspension device according to the invention in a multi-process machine.

DETAILED DESCRIPTION OF THE INVENTION

Figure 1:
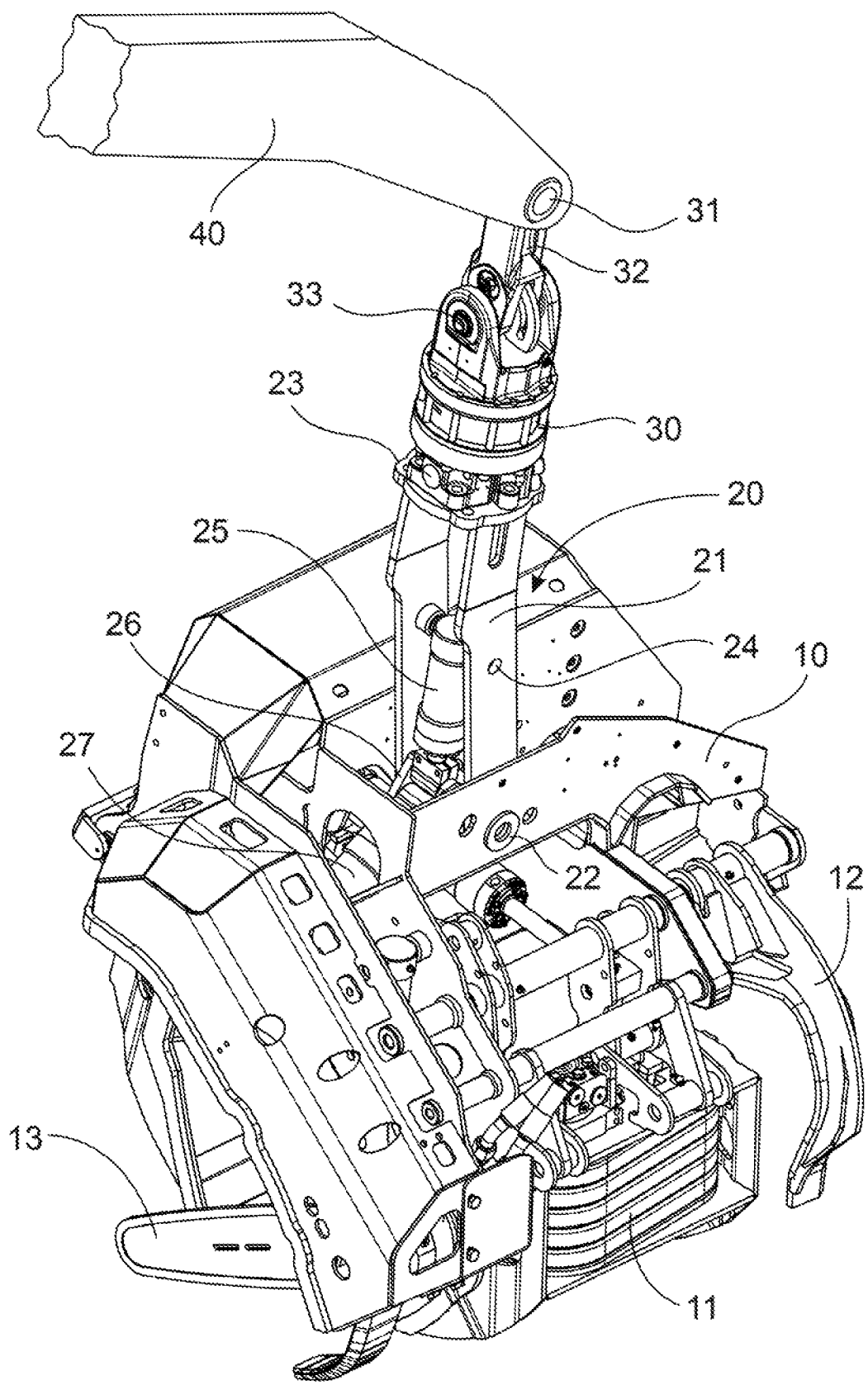
FIG. 1 depicts a multi-process machine in the log processing position.

A suspension device according to the invention is depicted in FIG. 1. The felling head consists of a frame 10, delimbing blades 12, a log feeding device 11 and a crosscut saw 13. The feeding device 11 can be roller- or track-driven or pulse-operated for pulling a log through the blades 12.

FIG. 1 is also a schematic view of the feeding device 11 wherein the feeding device is driven with two tracks. The crosscut saw 13 is a chain saw, but it can also be a guillotine type. The felling head can also be without a feeding device functioning as a so-called cutter head, i.e., for only felling trees.

A rotating device 30 is suspended on the boom 40 of the base machine with a pin 31. In addition, a so-called link 32 is provided between the rotating device 30 and the boom 40. The rotating device 30 can also be provided with a separate turning motor complemented by a cogwheel or chain transmission between these. The frame of the suspension device 20 advantageously consists of two beams or arms 21. The beams 2.1 are connected by a sleeve 28 (FIGS. 3, 4 and 5) at the bottom end and by a flange 23 at the top end. In turn, the flange 23 is connected to the rotating device 30. At the bottom end, the sleeve 28 between the beams 21 (not shown in FIG. 1) is around the pin 22 enabling for the beams 21 and the sleeve 28 to turn around the pin 22. The sleeve 28 is connected between the beams 21; that is, it binds these together at the bottom end. Another sleeve 29 is provided on the sleeve 28, between the beams 21. The sleeve 29 binds together the plates of the intermediate arm 26 as well as the connecting rods 261, 262 of the arms of the cylinders 25 and 27 in the plates. Furthermore, one end of the cylinder 25 is connected to the beams 21 with the pin 24. The other end of the cylinder 27 is connected to the frame 10 with the pin 210.

Figure 6:
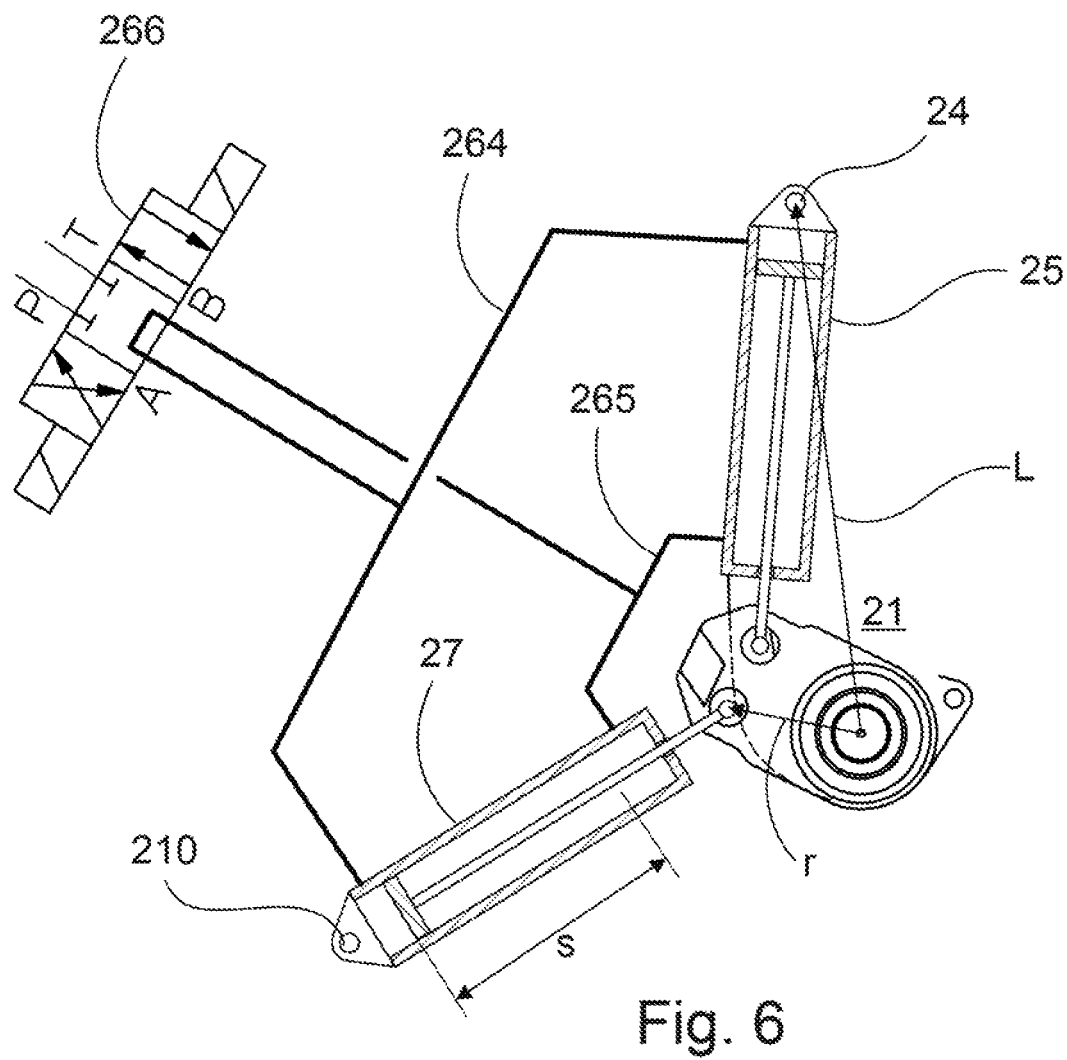
FIG. 6 shows the hydraulic diagram for operating the system.

The effective length, i.e., the joint spacing r (22-261/262) of the intermediate arm is approximately 24% (generally 15%-35%, more preferably 20%-28%) of the length L of the distance between the bottom joint 24 and the joint 24 that turns it, FIG. 6. However, the joint spacing r of the intermediate arm is a fraction (6%-15%) of the length of the entire beam calculated from the length of the distance between the joint 22 and the supporting joint of the rotator 30. Instead, said joint spacing r of the intermediate arm is within the same order of magnitude as the stroke length s of the hydraulic cylinders 25 and 27 (FIG. 6); more precisely, the joint spacing r is 70%-110%, more preferably 80%-100% of the stroke length s of the hydraulic cylinders 25, 27.

Figure 2:
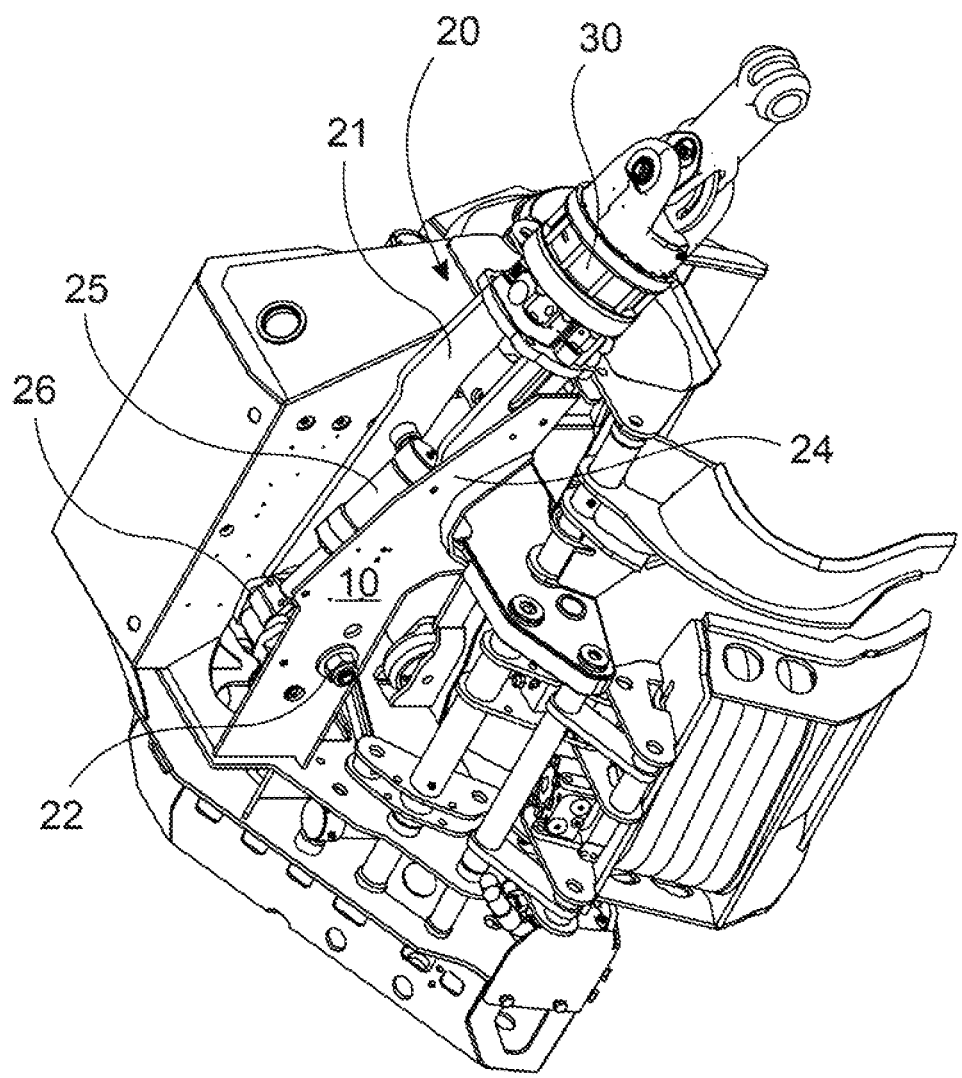
FIG. 2 depicts a multi-process machine in the tree felling position.
Figure 3:
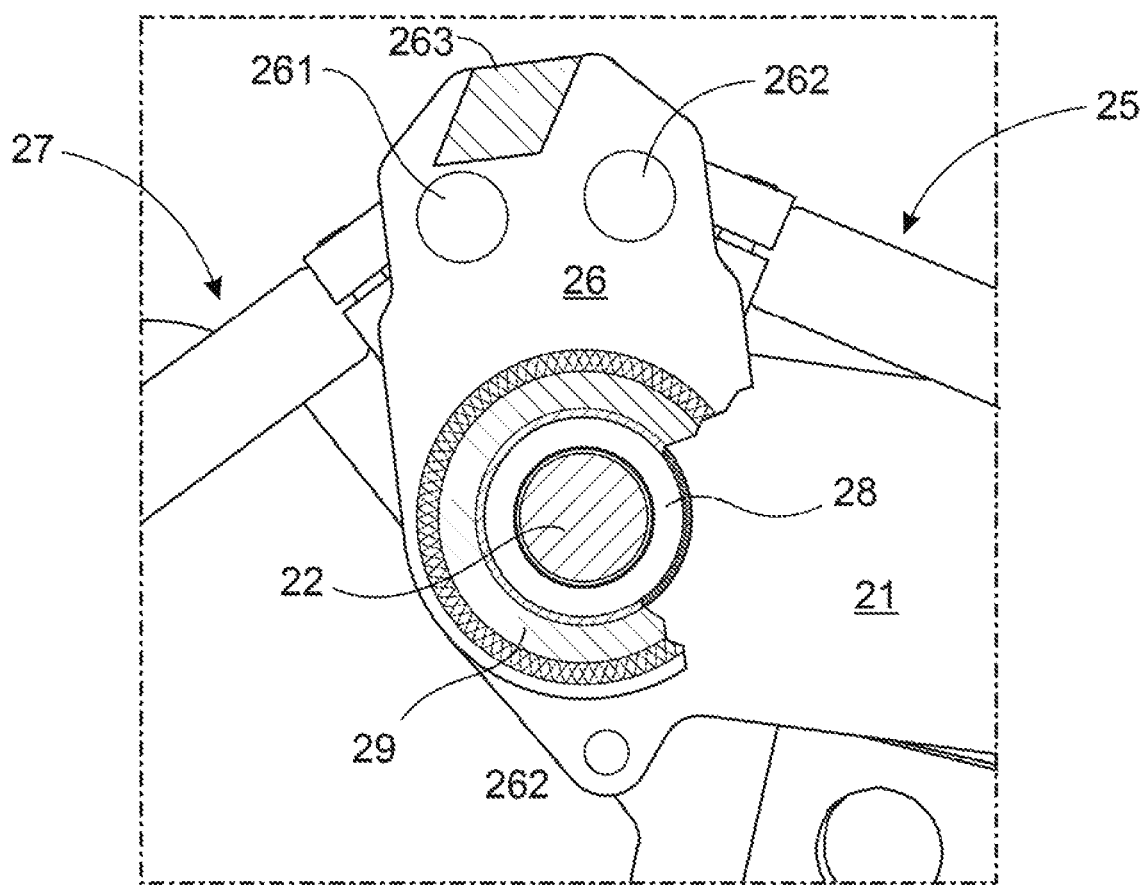
FIG. 3 depicts the joining of the freely pivoted arm of the suspension device to the other components.
Figure 4:
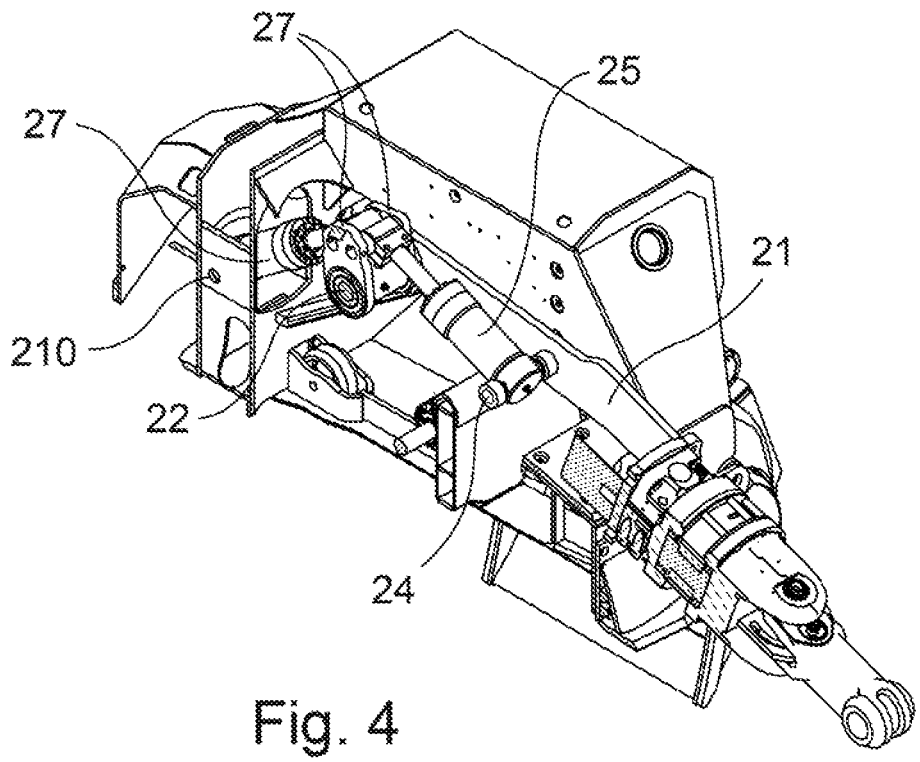
FIG. 4 is a sectional view of the situation of FIG. 2 for showing the intermediate arm.
Figure 5:
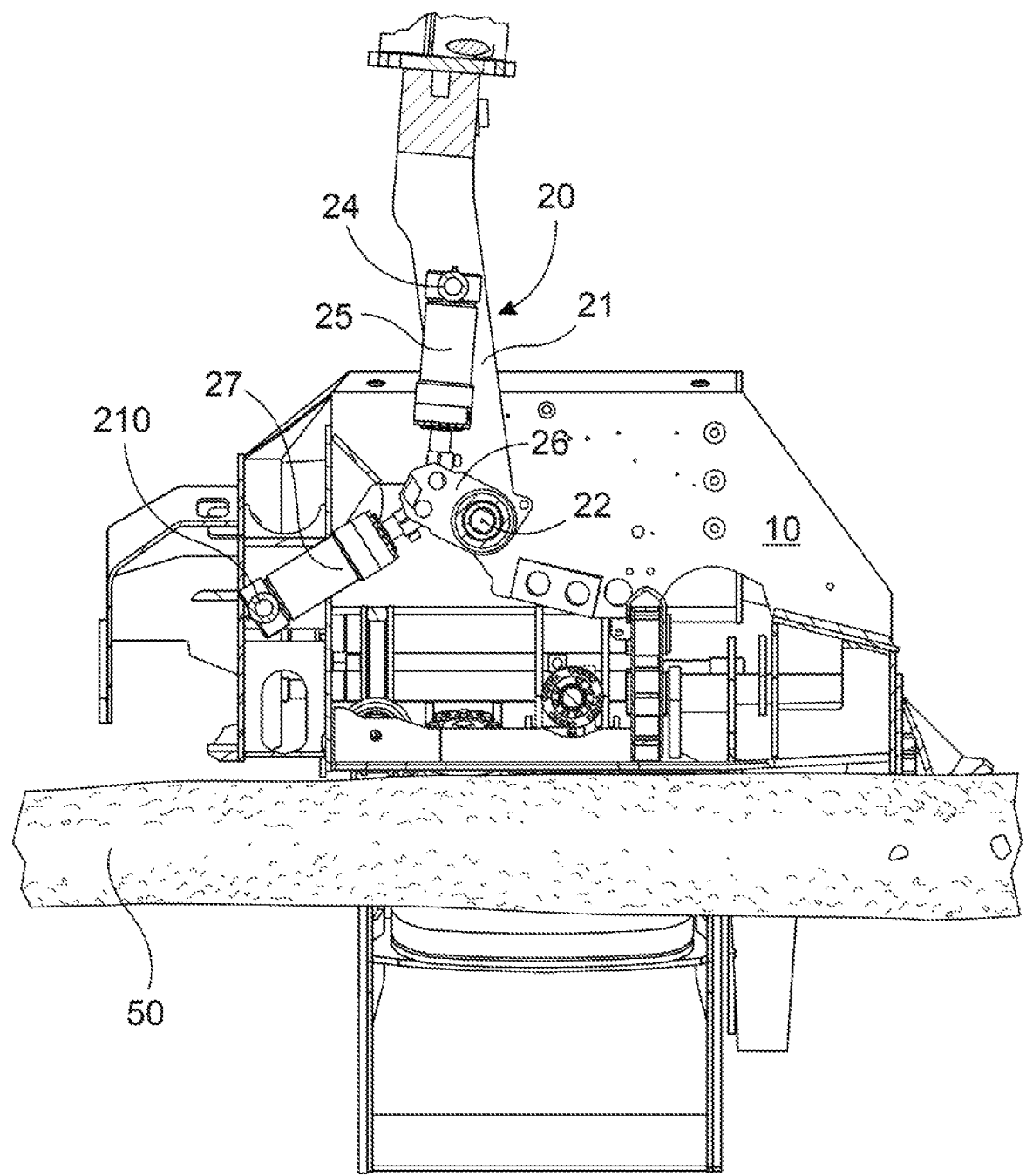
FIG. 5 is a sectional view in straight lateral projection of the situation of FIG. 1.

The operation is described in FIGS. 2, 3, 4 and 5. In FIG. 2, the felling head hangs freely, then the suspension device 2 is in the vertical direction bound to the rotating device 30. The lengths of the cylinders 25 and 27 relative to the pins 24, 262 and correspondingly to the pins 261, 210 settle freely, since the pins 261 and 262 of the intermediate arm 2.6 are connected to the freely rotating sleeve 29 (FIG. 3). This sleeve 29 is thus around the sleeve 28 that connects the beams 21 (in FIGS. 3, 4 and 5). The sleeve 28 can rotate around the pin 22. A stopper 263 connected to the intermediate arm has a counterpart in the frame (not shown) to prevent the intermediate arm from slipping out of the normal rotational range. Generally, this counterpart is not necessary, because the construction stabilises the intermediate arm 26 approximately in the centre position. The log 50 to be processed is shown in FIG. 5, which also depicts a cross-sectional view of the bottom part of the suspension device 20. FIG. 4 is a partial sectional view of the felling head.

In FIGS. 1-6, the cylinders 25 and 27 are placed one after the other, i.e., in the same plane. Thus, the intermediate arm 26 carried by the sleeve 29 has two pins 261, 262.

Hydraulic control of the hydraulic cylinders 25 and 27 is completely conventional except that, instead of one hydraulic cylinder, the system has two hydraulic cylinders side by side on both the cylinder and the piston rod side, FIG. 6. More complicated connections where hydraulic cylinders would be provided with a different supply are not excluded.

According to FIG. 6, the valve 266 controls the direction of rotation or leaves it floating; that is, the connections A and B are most preferably connected so that the harvester can float freely. Alternatively, the connections A and B are closed after performing the rotation. The cylinder sides are connected to line 265 (B) and the piston sides to line 264 (A).

In an embodiment, the cylinders 25 and 27 are placed side by side so that they can be bound to the intermediate arm with a common pin (not shown).

In the embodiment of FIGS. 1-6, the cylinders 25 and 27 are placed one after the other; in this way, space is saved in the lateral direction. At the same time, load against the sleeves 28 and 29 is symmetrical in the lateral direction. The intermediate arm 26 has a shared lug with two pins 261 and 262 therein so that the ends of the arms of the hydraulic cylinders 25 and 27 can be fitted to operate against each other. The hydraulic cylinders 25, 27 are equally long and have the same stroke length.

In FIG. 2, the suspension device is in a so-called felling position wherein the felling head 1 is in the vertical direction. The cylinders 25 and 27 are extended (FIG. 4). When the pins 261, 262 turn the sleeve 29 (not shown) via the intermediate arm 26, both cylinders have approximately equal torque angles. The freely rotating sleeve 29 turns due to the effect of both cylinders 25 and 27. The cylinders are dimensioned so that the torque of both cylinders is approximately equal in this position. Furthermore, it is noticed that the construction does not require a long stroke from one cylinder; nevertheless, the torque obtained by the suspension device 2, particularly in the felling position, is approximately 80%±10% of the maximum torque provided by the cylinders. In a one-cylinder system, the torque obtained is only approximately 30%±20%. The suspension device must always turn slightly past the vertical direction; 5°+5° in the figure. When the felling head is in a so-called rear position, the log in the gap would be leaning by about 50°. This position is needed particularly when working on slopes. Then the cylinders 25 and 27 are retracted. Since the torque requirement is smaller in this position compared to the felling position, lower torques can be permitted. As can be seen, the torque values are still approximately 60%±20% of the maximum torque. Now, it is possible to achieve a rear position of 50°±10%, which very well meets the application need.

The invention claimed is:

1. A felling head for a multi-process machine for felling and further processing trees, arranged to be suspended on the boom of a loader via a joint, said multi-process machine including a rotator for rotating the felling head, a suspension device, an actuator unit and a frame of the actuator unit, the frame connected to said suspension device for felling and further processing trees, said suspension device including
   - an arm for the suspension device, connected to said rotator, and a transverse frame joint in its bottom part for supporting the frame of the actuator unit, and
   - one hydraulic cylinder is pivoted at one end to said arm for the suspension device to rotate the suspension device relative to the frame for turning the actuator unit to felling and processing positions,
   - a freely rotating intermediate arm having first and second ends forming a joint spacing there between and pivoted to said frame joint at the said first end, and
   - another hydraulic cylinder pivoted at one end to the frame of the actuator unit and wherein both hydraulic cylinders are pivoted at their other ends to the second end of said intermediate arm.

2. The felling head for a multi-process machine according to claim 1, wherein the hydraulic cylinders are connected on both a piston rod side and a cylinder side into a hydraulic operating system.

3. The felling head for a multi-process machine according to claim 2, wherein the felling head includes a three-position control switch for operating the hydraulic cylinders, the three position control switch having a pressure line P and a tank line T at one side and connections A/B at the other side, wherein an optional side of the parallelly connected connections A/B is led to the pressure line P and the sides, A and B are connected in a center position allowing the felling head to float freely.

4. The felling head for a multi-process machine according to claim 1, wherein the joint spacing r of the first and second ends of the freely rotating intermediate arm is 70%-110% of a stroke length s of the hydraulic cylinders.

5. The felling head for a multi-process machine according to claim 1, wherein the joint spacing r of the first and second ends of the freely rotating intermediate arm is 15%-35% of a length L of the distance between a joint that turns the arm for the suspension device and the center joint.

6. The felling head for a multi-process machine according to claim 1, wherein the hydraulic cylinders are pivoted to the intermediate arm and to a common pivot shaft.

7. The felling head for a multi-process machine according to claim 1, wherein both the hydraulic cylinders are pivoted to the freely floating intermediate arm with a pivot shaft.

8. The felling head for a multi-process machine according to claim 1, wherein a stroke length of the hydraulic cylinders is substantially equal.

9. A multi-process machine including a base machine, a boom assembly and a felling head according to claim 1 suspended at the end of the boom assembly.

* * * * *